Sept. 4, 1951 L. BUSTIN 2,566,401
SWINGABLE STEP FOR MOTOR VEHICLES AND THE LIKE
Filed Sept. 6, 1949 2 Sheets-Sheet 1
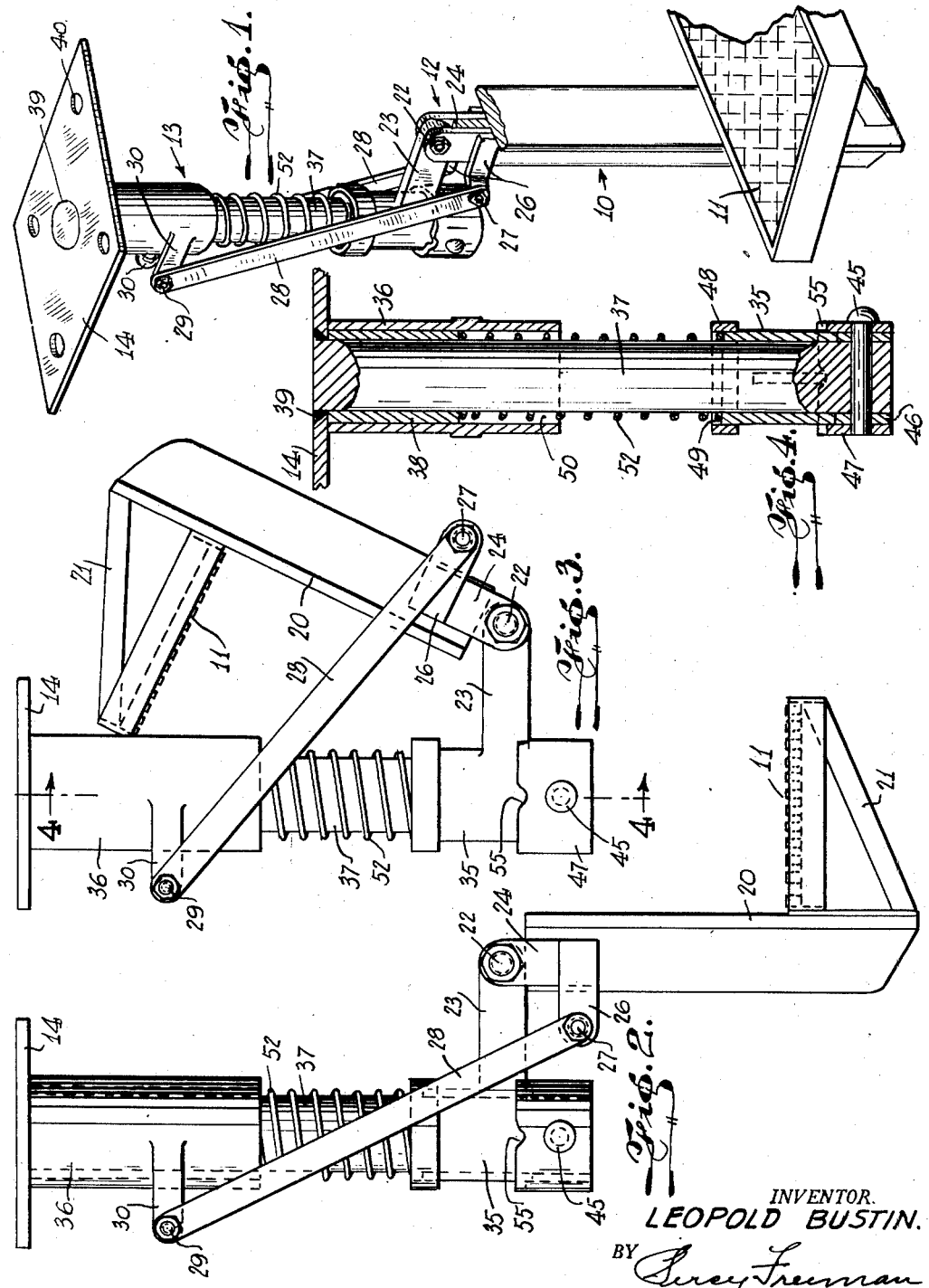
INVENTOR.
LEOPOLD BUSTIN.
BY Percy Freeman
ATTORNEY.

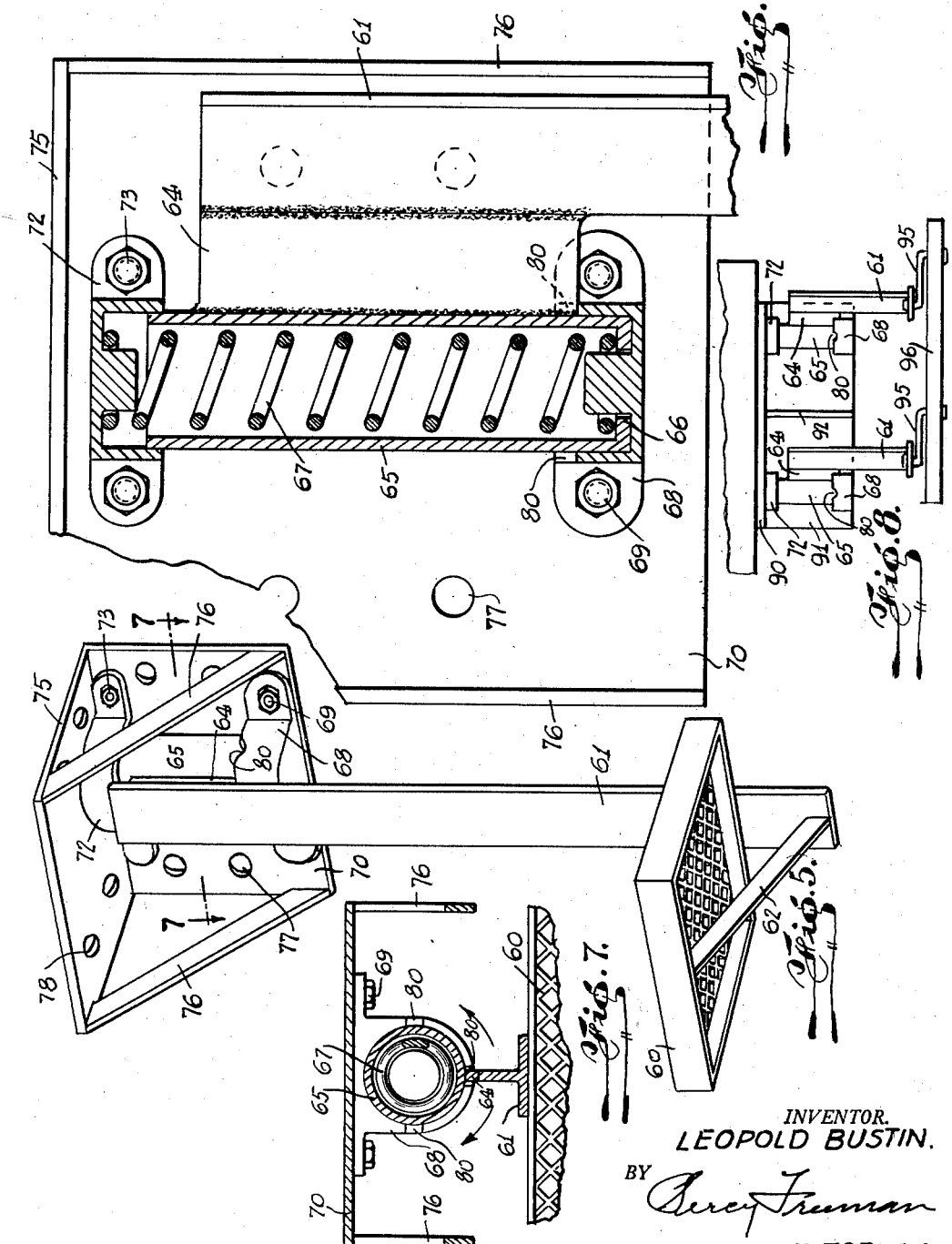

Patented Sept. 4, 1951

2,566,401

UNITED STATES PATENT OFFICE 2,566,401

SWINGABLE STEP FOR MOTOR VEHICLES AND THE LIKE

Leopold Bustin, Mamaroneck, N. Y.

Application September 6, 1949, Serial No. 114,075

2 Claims. (Cl. 280—167)

This invention relates to a swingable step for motor vehicles and the like.

It is frequently necessary to provide outwardly projecting steps for motor vehicles and the like. In close quarter driving these outwardly projecting steps occasionally encounter obstructions either in other motor vehicles or on the road itself and damage to the steps as well as to the other motor vehicles encountered, thereby results. Nor is it property damage alone that these outwardly extending steps produce: they have been known to strike and injure pedestrians.

The principal object of this invention is the provision of a swingable step for motor vehicles and the like, which extends outwardly from the sides thereof when it is in operative position and which is swung or held inwardly when in inoperative position. The swingable step constituting the present invention may be swung manually into outwardly projecting operative position or to inwardly held inoperative position. It is also swingable from operative to inoperative position when it encounters an obstruction in the road. Careful drivers will normally swing the present step into inoperative position before starting on the road; careless drivers may be expected, from time to time, to leave the step in its outwardly extending operative position. In the first case, the step will be positioned to avoid obstructions, and damage and injury to property and person will thereby and to that extent be averted. In the second case, the outwardly projecting step may strike obstructions, but if it does it will automatically swing out of the way and damage or injury will thereby be minimized or perhaps totally avoided.

Another object of this invention is the provision of an outwardly projecting step for motor vehicles, which is both swingable and foldable into inoperative position. This motor vehicle step is swingable, either manually, or when it strikes an obstruction, from operative to inoperative position on a vertical pivot. It is also foldable on a series of horizontal pivots from operative to inoperative position. Its folding feature will normally be employed to swing the step out of operative position at the conclusion of a loading or unloading operation and before the truck takes to the road. Should the operator of the truck inadvertently fail to fold the step out of the way, it will swing out of the way on its vertical pivot if it should happen to strike an obstruction while the truck is under way.

A further object of this invention is the provision of a swingable and foldable step of the character described, which is extensible to an operative position which is very considerably below that part of the body or chassis of the motor vehicle to which it is attached. This is an exceptionally important feature in connection with motor vehicles whose chassis and bodies are elevated well above the ground surface.

Preferred forms of this invention are shown in the accompanying drawing in which Fig. 1 is a perspective view of a swingable and foldable step made in accordance with one form of this invention, part of the T-bar being broken away for clarity.

Fig. 2 is a side view thereof.

Fig. 3 is another side view thereof, showing the step in folded, inoperative position.

Fig. 4 is a vertical section on the line 4—4 of Fig. 3.

Fig. 5 is a perspective view of a swingable step made in accordance with a second form of this invention.

Fig. 6 is a vertical section through the swivel mechanism thereof.

Fig. 7 is a horizontal section on the line 7—7 of Fig. 5.

Fig. 8 is a front view of a swingable step made in accordance with a third form of this invention, showing a single step or step platform supported by two swivel mechanisms of the kind shown in Fig. 6.

Referring now to the first form of this invention and to the first four figures of the drawing, it will be seen that a step 10 made in accordance with said first form of the invention comprises a step or step platform 11, a folding mechanism 12 which supports said step, a swivelling mechanism 13 which supports the folding mechanism and a plate or bracket 14 which is fastened to the chassis or body of the motor vehicle and which supports said swivelling mechanism. Step 11 may be of conventional construction and it may be fastened to a T-bar or bracket 20. A brace or strut 21 may be fastened both to the step and to said T-bar to assist in supporting the step on said T-bar. Said step, T-bar and brace may be welded or bolted to each other or they may be fastened to each other in any other suitable manner.

T-bar 20 is part of the folding mechanism 12 above mentioned. A horizontal pivot which may be a bolt 22 supports the upper end of said T-bar from a horizontally extending arm 23. More specifically, a pair of side pieces 24 are fastened to the upper end of said T-bar, by welding or otherwise and these side pieces are thereby adapted to straddle arm 23. Registering holes in arm 23 and side pieces 24 accommodate bolt 22. Side pieces 24 extend vertically of T-bar 20. A second pair of side pieces 26 are fastened to side pieces 24, by welding or other suitable means, and this second pair extend horizontally or backwardly of the T-bar. A horizontal pivot, which may be a bolt 27, attaches a pair of links 28 to said second pair of side pieces 26. It is the lower ends of said links which are thus pivotally secured to the second pair of side pieces 26, and through them, to the T-bar 20. The upper ends of links 28 are pivotally secured by means of a horizontal pivot which may constitute a bolt 29 to a third pair of side pieces 30.

Arm 23 is affixed to a sleeve 35 and side pieces 30 are affixed to a sleeve 36. Both sleeves are mounted on a vertical column 37, sleeve 35 being directly mounted on said column and sleeve 36 being mounted on an inner sleeve 38 which is mounted directly upon said column. It will be seen in Fig. 4 that plate 14 is affixed to the top end of column 37 by means of welding 39 or in any other suitable manner. Plate 14 has holes 40 formed therein to accommodate screws or bolts for fastening said plate to the chassis or body of the motor vehicle. It will thus become apparent that the entire structure herein described and claimed is supported by plate 14 and column 37 which is affixed to said plate.

Affixed to the lower end of column 37, by means of a removable pin 45, is a pair of collars 46 and 47 respectively. These collars are concentric with each other and collar 46 is the inner collar and collar 47 is the outer collar. The outer collar 47 has a greater axial length than the inner collar and it projects upwardly a short distance above the top of the inner collar. An annular space is thereby formed between the upper end of the outer collar and the column 37 and it will be apparent from an examination of Fig. 4 that said annular space is adapted to receive the lower end of sleeve 35. At the top end of sleeve 35 is still another collar 48 and it will be noted that said collar is mounted on the outside of sleeve 35 and that it projects upwardly above the top of said sleeve. An annular space is thereby formed between the upwardly projecting portion of collar 48 and column 37. Reference to Fig. 4 will disclose the fact that sleeve 36 projects downwardly below the bottom of sleeve 38 and still another annular space is thereby formed, this time between the downwardly projecting portion of sleeve 36 and column 37. The annular space which collar 48 provides is identified in the drawing by means of the reference character 49 and the annular space which is defined by sleeve 36 is identified by means of the reference character 50. A compression spring 52 is mounted on column 37 and its upper end is accommodated by annular space 50 and its lower end by annular space 49. Its upper end bears against sleeve 38 and its lower end against sleeve 35. Sleeves 36 and 38 are fixed to each other by welding or any other suitable manner and hence upward pressure of the spring urges both sleeves 36 and 38 to bear against plate 14. The pressure of the spring against sleeve 35 urges that sleeve to bear against inner collar 46.

It will be seen from the foregoing that plate 14 which is fastened to the motor vehicle supports column 37 and that column 37 supports collar 46. Said collar 46 supports sleeve 35 and said sleeve, by means of side pieces 23 and 24 and bolt 22, supports the upper end of T-bar 20. The lower end of the T-bar, with the aid of strut 21, supports step 11. Sleeve 35 also supports spring 52 and said spring supports sleeves 36 and 38. Links 28 are supported at their upper end by means of bolt 29 and arms 30 which are fastened to sleeve 36, and at their lower end, said links are connected to the T-bar by means of bolt 27 and side pieces 26. Links 28 extend diagonally across column 37 from side pieces 26 to arms 30 and said links are thereby enabled to serve as a brace with respect to T-bar 20, preventing said T-bar from pivoting on bolt 22. Upward movement of the diagonal links is prevented by the positive engagement of sleeve 36 with plate 14 and downward movement of sleeve 35 is prevented by its positive engagement with inner collar 46.

The step and T-bar assembly may be swung upwardly and out of the way, from its operative position shown in Fig. 2 to its inoperative position shown in Fig. 3, by simply swinging it forwardly (toward the right as viewed in Fig. 2) and then upwardly. This has the effect of pulling links 28 downwardly and then releasing them for upward movement. The downward movement of said links takes place against the action of the compression spring and the upward movement of said links takes place with the aid of said compression spring. It will be apparent, therefore, that whether the links are in their Fig. 2 position or in their Fig. 3 position, they will be resiliently held in such positions by the compression spring. In effect, then, it will be seen that a toggle arrangement is provided between links 28 and T-bar 20, wherein the spring tends to hold the links, and hence the T-bar, in either of their respective extreme or over-center positions.

Sleeves 36 and 38 are free to rotate about column 37 as is sleeve 35. It will be noted, however, that collar 47 which is pinned to said column 37, is provided with a plurality of notches 55, and that arm 23 which is affixed to sleeve 35, is in engagement with one of said notches. See Figs. 3 and 4. This engagement of arm 23 with any one of notches 55 will normally prevent sleeve 35 from rotating or swivelling on column 37 and hence the step will thereby be prevented from swivelling about said column. The action of spring 52 will tend to hold arm 23 in its notch 55. It will be noted in Figs. 2 and 3 that notches 55 have rounded or beveled sides and it will be apparent, therefore, that arm 23 may be cammed out of any one of said notches by simply pushing or pulling the step assembly sidewardly in either direction. The sole resistance to such sideward movement, speaking broadly, is the force exerted by the spring upon sleeve 35 and a judicious selection of a spring of appropriate resilience will insure a swivelling movement of the step assembly about the column, whenever said step assembly encounters an obstruction in the road.

The form of invention shown in Figs. 5, 6 and 7 differs from the form of invention above described principally in that the step assembly shown in Figs. 5, 6 and 7 is adapted to swivel only, whereas the step assembly in the first form of the invention is adapted to fold or swing upwardly in addition to being able to swivel sidewardly. A step 60 is affixed to a T-bar 61 and it is braced thereon by means of a strut or brace 62. The top end of the T-bar has an extension piece 64 welded thereto and extending backwardly therefrom, and said extension piece is welded to a sleeve 65. The lower end of the sleeve has an inwardly turned flange 66 on which a compression spring 67 rests. The flanged lower end of sleeve 65 is supported by a bracket 68 which is fastened by means of bolts 69 to a vertically extending plate 70. The top end of sleeve 65 projects into a similar bracket 72 which is also fastened to plate 70 by means of bolts 73. These brackets 68 and 72 have circular recesses formed therein to accommodate said top and bottom ends of the sleeve and to enable said sleeve to rotate in said brackets. A horizontal plate 75 is also provided and said plate is welded to the top edge of vertical plate 70. A pair of braces 76 welded to the opposite or distal side edges of said plates braces them, and maintains their angular relationship. Holes 77 are provided in the vertical plate 70 and holes 78 are provided in the horizontal plate 75 to enable said plates to be bolted or screwed to the chassis or body of a motor vehicle.

It will be seen in Fig. 6 that extension piece 64 projects into one of several notches 80 formed in lower bracket 68. These notches are similar to notches 55 of the first form of the invention and extension piece 64 corresponds to arm 23 of said first form of the invention. Spring 67 bears upwardly against the upper bracket 72 and downwardly against flange 66 of the sleeve and hence it tends to resist dislodgement of extension piece 64 from the notch 80 which it happens to engage. Nonetheless, the step assembly will swivel sidewardly when it strikes an obstruction since its extension piece 64 will thereby be cammed out of notch 80 despite the downward force exerted thereon by the spring.

Fig. 8 shows a construction which is basically similar to the construction shown in Figs. 5, 6 and 7. More specifically, it comprises a horizontal plate 90 and a vertical plate 91 and a strut 92 serving as a brace for said plates. It has a pair of sleeves 65 mounted in a pair of top brackets 72 and a pair of bottom brackets 68. It has two T-bars 61 with two extension pieces 64. At the bottom of each T-bar is a crank-shaped arm 95 fixedly connected thereto and said crank-shaped arms are also swivelly connected to a relatively long step 96. Both crank arms swivel in unison with the two sleeve assemblies, thereby enabling the step to swivel therewith.

The foregoing is illustrative of preferred forms of this invention and it will be understood that these forms may be modified in many ways and that other forms may be provided within the broad scope and spirit of the invention.

I claim:

1. A step for motor vehicles and the like, comprising a vertical column, a pair of sleeves on said column, one at the top thereof and one at the bottom, a stop member at the top of the column preventing the upper sleeve from moving upwardly beyond a predetermined point, a stop member at the bottom of the column preventing the lower sleeve from moving downwardly below a predetermined point, a compression spring between the two sleeves which maintains them in tensioned, spaced relationship, a notched member fixed to the bottom of the column below the lower sleeve, a notch engaging member connected to the lower sleeve for engagement with the notches in said notched member, a step pivotally secured to said notch engaging member on a horizontal pivot, and a pair of links which are pivotally secured at their upper ends to the upper sleeve and at their lower ends to the step, both pivots being horizontal and the pivot at the lower end of the links being offset from the pivotal connection between the step and the notch engaging member.

2. A step for motor vehicles and the like comprising a vertical column, a sleeve slidable on said column, a stop on the lower end of said column to limit the downward movement of said sleeve, an arm extending transversely from said sleeve, a coil spring strung on said column above said sleeve, a stop at the upper end of the column against which said spring abuts, said sleeve being yieldingly maintained at the lower end of the column by said spring, a notched member fixed to the bottom of the column below the sleeve, said transversely extending arm serving as a notch-engaging member for engagement with the notches of the notched member, a step pivotally secured to said transverse arm on a horizontal pivot, a pair of links pivotally secured at their upper ends to a pair of extending side pieces carried by said column and at their lower ends to the step, both said pivots being horizontal and the pivot at the lower end of the links being offset from the pivotal connection between the step and the notch-engaging member.

LEOPOLD BUSTIN.

REFERENCES CITED

The following references are of record in the file of this patent:

UNITED STATES PATENTS

| Number | Name | Date |
|---|---|---|
| 398,496 | Cork | Feb. 26, 1889 |
| 432,424 | Miller | July 15, 1890 |
| 605,428 | Hopkins | June 7, 1898 |
| 895,069 | Buckwalter | Aug. 4, 1908 |
| 992,785 | Lloyd | May 23, 1911 |
| 2,488,316 | Mosby | Nov. 15, 1949 |
| 2,494,367 | Steele et al. | Jan. 10, 1950 |